INVENTOR
JOSEPH A. ROGUS
BY
*Baldwin, Doran & Egan*
ATTORNEYS

United States Patent Office 3,455,463
Patented July 15, 1969

3,455,463
CLIP-SUPPORTED SHELF FOR TIERING AND NESTING RACK
Joseph A. Rogus, Willowick, Ohio, assignor to Mid-West Metallic Products, Inc., Cleveland, Ohio, a corporation of Ohio
Filed Nov. 29, 1966, Ser. No. 597,608
Int. Cl. A47f 5/01
U.S. Cl. 211—126                                      1 Claim

ABSTRACT OF THE DISCLOSURE

A shallower receptacle, or shelf, is supported near the top of a deeper receptacle by supporting the upper edge of the shallower receptacle from a tiering support seat or clip on the deeper receptacle near the upper edge thereof, the purpose of which tiering support seat is to hold two of the deeper receptacles in tiered relationship one above the other.

---

This invention is in the nature of an improvement over my Patent No. 3,202,294, granted Aug. 24, 1965. The nesting and stacking of two similar deeper receptacles as disclosed herein was described and claimed in Patent No. 2,931,535, granted Apr. 5, 1960, to Warren H. Lockwood.

This invention is in the field of rigid stackable and nestable receptacles which require no moving parts for stacking one receptacle above a lower like receptacle and wherein there is no change of relative orientation between the upper and lower receptacle when moving from the tiered or stacked position to the nested position.

To illustrate a use of this invention in the bakery field, deeper receptacles of the type shown here may be used for the storage and transportation of loaves of bread. If, however, a shallower type of baked goods is being handled such as pies, cakes and cookies, then it is desirable to provide a shallower receptacle in the upper portion of the deeper receptacle in the nature of a shelf whereby the bottom of the shallower receptacle is held spaced above the bottom of the deeper receptacle so that two layers of the shallower type of baked goods may be stored and transported in a single one of the deeper receptacles. To applicant's knowledge, no one has previously supplied such a dividing shelf in a deeper receptacle in the cheap, efficient and practical manner disclosed herein.

This invention is an improvement in a know tierable and nestable receptable of the deeper type which has tiering seats inside and near the top of the upper edge of parallel side walls adapted to receive tiering supports near the bottom of an upper like receptacle so as to stack or tier two like receptacles vertically one above the other. The construction is such that by lifting the upper receptacle from its tiered position and shifting it slightly endwise relative to the lower receptacle, the lower tiering support portions of the upper receptacle clear the tiering seats of the lower receptacle and the two receptacles are adapted to nest the upper one downwardly into the lower one. The improvement of this invention provides a support member for a shallower receptacle which is located just below the tiering seats above described and the shallower receptacle has laterally outwardly extending projections, here shown as an upper edge wire, adapted to slide endwise into the upper receptacle and above the new shallow receptacle supports of this invention to a position where the shallow receptacle is substantially vertically aligned in the deeper receptacle and firmly held against shifting endwise or sidewise in the deeper receptacle, thus providing the bottom of the shallow receptacle as a sort of shelf spaced above the bottom of the deeper receptacle.

Figure 1:
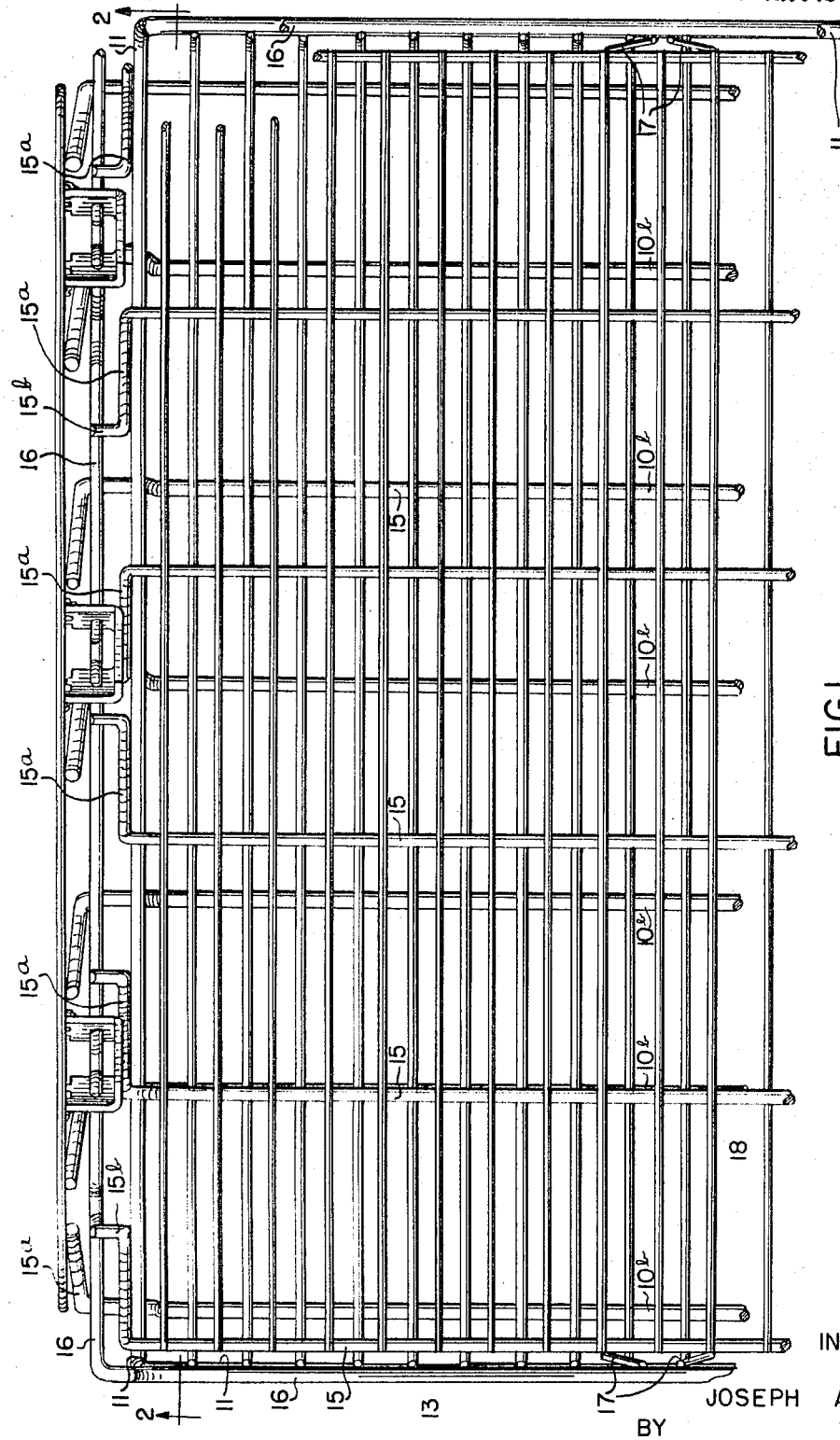
Figure 2:
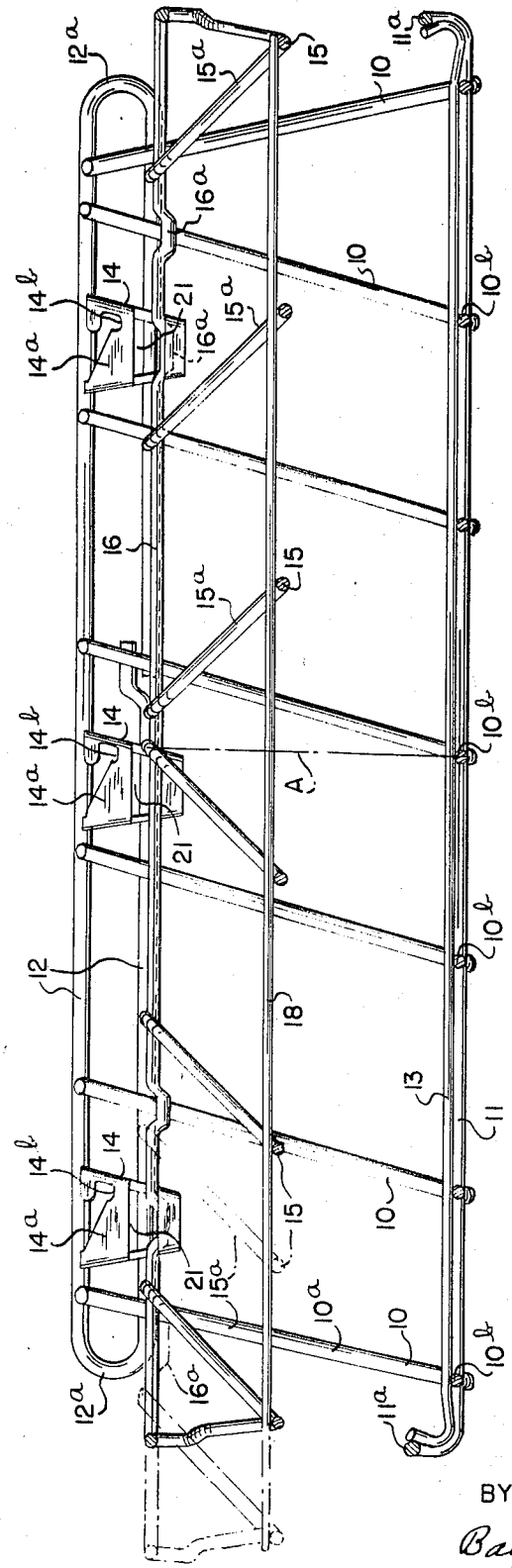
Figure 3:
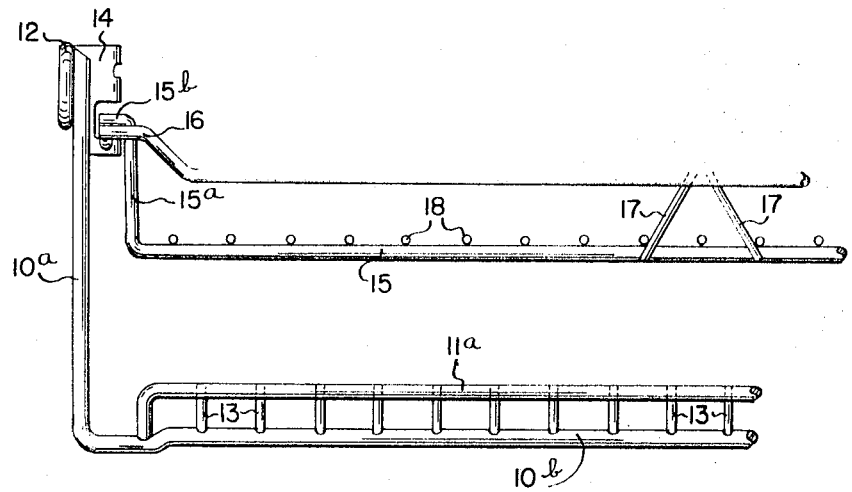
Figure 4:
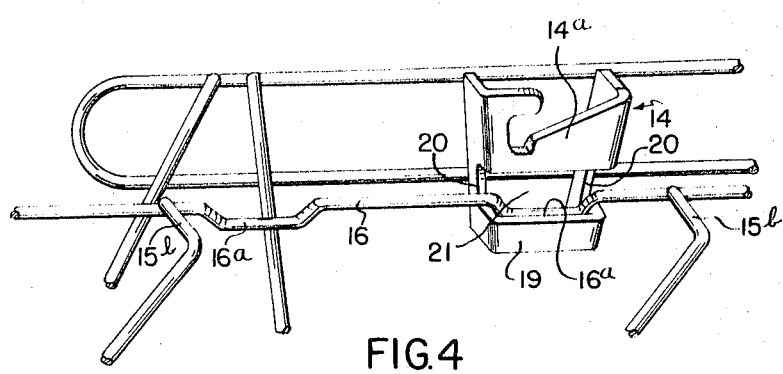

In the drawings:
FIG. 1 is a fragmental top plan view of the invention with the shallower receptacle assembled in the deeper receptacle;
FIG. 2 is a sectional view taken generally from the position of the line 2—2 of FIG. 1 except that this is a mirror image showing the opposite side;
FIG. 3 is a fragmental end view of the device of FIGS. 1 and 2; while
FIG. 4 is a fragmental sectional view of one of the tiering support seats showing how the upper edge wire of the shallower receptacle nests in the lower extension of the tiering support seat.

For the most part, the deeper receptacle involved in this invention is substantially like that shown in my Patent No. 3,202,294. The general framework of this receptacle comprises a plurality of rather heavy wires 10 having vertically extending side wall portions 10a lying in parallel planes on opposite sides of the receptacle and joined by bottom portions 10b which underlie the bottom of the receptacle and which join the side wall portions 10a at approximately 90 degree angles. Another heavy wire 11 extends entirely around the bottom of the deeper receptacle and being bent upwardly at the ends 11a to prevent material sliding off the bottom of this receptacle. At their upper ends, the side wall wires 10a are tied together by upper edge wires 12 which are parallel and joined at their opposite ends by semi-circular portions 12a. The bottom of this receptacle is constructed in any desirable manner to hold materials thereon and in the present instance is composed of a plurality of parallel wires 13 of a lighter gauge than the frame wires extending the full length of the bottom and turned upwardly at the ends and welded to the bottom end wires 11a. All of these wires thus far described are rigidly secured together as by welding.

Near the upper edges of the side walls of this deeper receptacle there are rigidly secured thereto tiering support seats 14 like those shown in my above mentioned patent as to the upper portion thereof. These are generally U-shape pieces of metal lying horizontally, having their free ends welded to the wire portions 12 and each having a cross portion 14a lying approximately parallel to the wires 12. The upper end of this cross portion has an inclined slot terminating in a tiering recess 14b which lies directly vertically above one of the bottom wires 10b as indicated by the dot-dash line A in FIG. 2. As taught in my above mentioned patent, these deeper receptacles may be tiered one above the other by placing the bottom wires 10b in the appropriate recesses 14b so as to tier or stack like receptacles vertically in line. To move the upper receptacle from this tiered position to nested position in the lower receptacle, the wires 10b of the upper receptacle are moved upwardly out of the recesses 14b, then moved slightly toward the right as viewed in FIG. 2 in a linear motion, and then the upper receptacle will nest downwardly in the lower receptacle with the side wall wires 10a of the upper receptacle lying parallel to similar wires in the lower receptacle. All of the above described structure is covered in my Patent No. 3,202,294.

The present invention adds a novel extension below the tiering support members of my patent in order to permit the easy entrance and removal of a shallower receptacle when it is desired to carry articles of a lower vertical height than those normally accommodated in the deep receptacle. This shallower receptacle comprises a frame of parallel wires 15 which extend crosswise of the bottom of this shallower receptacle and have their opposite ends turned upwardly at approximately right angles as indicated at 15a. These members form a side wall for the shallower receptacle and have their upper ends turned horizontally outwardly as at 15b where they are welded to an upper edge wire 16 which extends entirely around the upper periphery of the shallower receptacle. As clearly noted in FIG. 2, the side wall wire portions 15a have the three left-hand wires sloped upwardly and toward the center and on the opposite end the three wires there are sloped upwardly and in the opposite direction toward the center of the receptacle.

Preferably, bracing wires 17 near the center of opposite ends of the shallower receptacle are welded between the upper wire 16 and the end wire 15 on the bottom so as to rigidly support the parts there. The bottom of the shallower receptacle is composed of a plurality of parallel wires 18 welded to all of the wires 15.

The means here shown for supporting the shallower receptacle in the deeper receptacle comprises supplemental supports in the form of extensions in the lower portions of the tiering support seats 14. This is in the form of a generally U-shape member 19 spaced below the wall portion 14a of the tiering seat member 14 as clearly seen in FIG. 4. This U-shape member is positioned horizontally with the ends of the U-shape extending laterally outwardly and shown as being joined integrally with the upper portion of the tiering seat 14 by wall portions 20. This spacing of the U-shape member 19 below the tiering seat 14 provides a slot 21 through which the upper edge wire 16 and the attached portions 15b are adapted to slide endwise. The slot 21 may be termed a slotted recess opening inwardly and accessible at its ends to pass wire 16. To hold the shallower receptacle against relative movement either endwise or sidewise relative to the deeper receptacle, positioning formations 16a are provided adapted to nest downwardly into the U-shape supporting members 19 as clearly shown in FIGS. 2 and 4. If desired, a plurality of these projections 16a may be provided so as to support the shallower receptacle in different positions endwise relative to the deeper receptacle as illustrated by the dot-dash line position of the shallower receptacle in FIG. 2.

It should be understood that the arrangement of these two receptacles is symmetrical about the line B—B of FIG. 1, one side being the mirror image of the other side looking outward from the line.

In the use of this invention, the deeper receptacles may be used in the same manner as those described in my Patent No. 3,202,294. If, however, it is desired to divide the receptacle horizontally so as to provide a shelf-like horizontal partition between the top and bottom thereof, then the shallower receptacle is entered lengthwise into the deeper receptacle by moving its upper rim 16, on opposite sides of the receptacle, through the slots 21 of the tiering seat extensions either to the full line position of FIG. 2 or to a broken line position depending upon whether one desires complete registration of the two receptacles or desires the bottom of one to lie in a stepped relationship to the bottom of the other. Thus, the bottom 18 of the shallower receptacle is spaced above and parallel to the bottom 13 of the deeper receptacle providing a shelf-like horizontal partition there. In this manner, it is simple and quick to transfer the shallower receptacle into and out of the deeper receptacle as desired. It will be noted that the shallower receptacles can be nested one within the other because of the inclined arrangement of the members 15a and because the opposite ends are inclined downwardly and inwardly from the end member 16 to the end member 15 as clearly seen in FIG. 1.

What is claimed is:

1. In a deeper receptacle adapted for tiering with a like deeper receptacle, and having a generally planar bottom with generally parallel side walls upstanding from said bottom and rigid therewith, and having tiering seats near the tops of said side walls adapted to receive tiering support portions near the bottoms of said side walls of a like receptacle; the combination therewith of shallower receptacle supports carried by said tiering seats, wherein each of said tiering seats comprises a sheet of material U-shaped and lying horizontally with the free ends of said U-shape material rigidly secured to said deeper receptacle side wall, an upper portion of said seat having an upwardly opening tiering recess adapted to receive a lower portion of a like deeper receptacle in tiered relationship, and a lower portion of said seat being vertically spaced below said upper portion providing a horizontally extending slotted recess between said upper and lower portions open at its ends to receive said upper portions of a shallower receptacle positioned inside said deeper receptacle.

References Cited

UNITED STATES PATENTS

| 2,803,369 | 8/1957 | Fleetwood. | |
| 2,923,428 | 2/1960 | Averill | 211—126 XR |
| 3,022,900 | 2/1962 | Averill | 211—126 |
| 3,079,206 | 2/1963 | Glezen | 108—91 XR |
| 3,202,294 | 8/1965 | Rogus | 211—126 |

ROY D. FRAZIER, Primary Examiner

U.S. Cl. X.R.

220—97